(12) United States Patent
Naitou

(10) Patent No.: US 9,310,670 B2
(45) Date of Patent: Apr. 12, 2016

(54) PROJECTOR AND DIMMING METHOD

(75) Inventor: Michitaka Naitou, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 178 days.

(21) Appl. No.: 14/114,512

(22) PCT Filed: May 25, 2011

(86) PCT No.: PCT/JP2011/061932
§ 371 (c)(1),
(2), (4) Date: Oct. 28, 2013

(87) PCT Pub. No.: WO2012/160658
PCT Pub. Date: Nov. 29, 2012

(65) Prior Publication Data
US 2014/0049757 A1   Feb. 20, 2014

(51) Int. Cl.
*G03B 21/20* (2006.01)
*H04N 9/31* (2006.01)
*H04N 5/58* (2006.01)

(52) U.S. Cl.
CPC .............. *G03B 21/2053* (2013.01); *H04N 5/58* (2013.01); *H04N 9/3155* (2013.01); *H04N 9/3194* (2013.01)

(58) Field of Classification Search
CPC ............. G03B 21/2053; G03B 21/206; H04N 9/3155; H04N 9/3194; H04N 5/58
USPC ......................................................... 353/85
See application file for complete search history.

(56) References Cited

U.S. PATENT DOCUMENTS

2009/0036158 A1   2/2009  Fujinawa et al.
2010/0302515 A1*  12/2010  Plut ................................. 353/85

FOREIGN PATENT DOCUMENTS

| JP | 2004-163686 A | 6/2004 |
| JP | 2005-055760 A | 3/2005 |
| JP | 2006-524361 A | 10/2006 |
| JP | 2007-225650 A | 9/2007 |
| JP | 2009-086272 A | 4/2009 |
| JP | 2010-160224 A | 7/2010 |
| WO | WO 2007/029805 A1 | 3/2007 |
| WO | WO 2007/049659 A1 | 5/2007 |

OTHER PUBLICATIONS

Mori, Kenji; JP 2007-225650; Sep. 6, 2007; Machine Translation in English.*
International Search Report (ISR) (PCT Form PCT/ISA/210), in PCT/JP2011/061932, dated Jun. 28, 2011.

* cited by examiner

*Primary Examiner* — William C Dowling
*Assistant Examiner* — Ryan Howard
(74) *Attorney, Agent, or Firm* — McGinn IP Law Group, PLLC

(57) ABSTRACT

With the purpose of controlling a light source to appropriately reduce the brightness of reflected light at the time of starting projection according to the conditions under which a projector is being used, the projector includes a solid-state light source unit that emits light, a power supply unit that supplies driving electric power to the solid-state light source unit, an image display device that modulates the light emitted from the solid-state light source unit according to an image signal and that projects the modulated light onto a projection surface, and a detection unit that detects the intensity of the ambient light of the projection surface.

12 Claims, 2 Drawing Sheets

PROJECTOR AND DIMMING METHOD

TECHNICAL FIELD

The present invention relates to a projector and a dimming method, and more particularly to a projector and dimming method for adjusting the intensity of light that is projected on a screen.

BACKGROUND ART

LEDs (Light Emitting Diodes) and LDs (Laser Diodes) that are made up from semiconductor elements are in many cases used as the light sources of projectors that project images on a screen. In contrast to lamps that are typically used, an LD or LED that is used as a light source has characteristics that allow the maximum light quantity to be emitted from the time of starting projection of an image.

In a projector that uses LDs or LEDs as the light source, when the power supply button is pressed ON, when instructions are given to project an image, and when light emitted from the light source at the maximum light quantity, the reflected light upon the screen may be perceived as excessively bright because the light quantity is at the maximum from the start.

In Patent Document 1, a projector is described that is capable of preventing reflected light from being perceived as excessively bright at the time of starting projection of an image. The projector disclosed in Patent Document 1 is provided with a light source that emits light, and a projection unit that projects images by the light that is emitted from the light source.

When instructions to project an image are carried out in the projection unit in the projector described in Patent Document 1, a pre-projection image in which the entire surface is the same color is projected at a light quantity that is lower than the light quantity light emitted from the light source when projecting the projection image, following which the projection image is projected.

LITERATURE OF THE PRIOR ART

Patent Documents

Patent Document 1: Japanese Unexamined Patent Application Publication No. 2010-160224

SUMMARY OF THE INVENTION

Problem to be Solved by the Invention

When a projector is used under conditions in which the vicinity of the projector is bright, the reflected light on the projection surface may not appear excessively bright at the time of starting projection of an image. Even under these conditions, when instructions to project an image carried out in the projector described in Patent Document 1, the light quantity of light that is emitted from the light source is reduced to project a pre-projection image using a light quantity that is lower than when projecting a projection image, following which the projection image is projected.

As a result, the problem arises that even under conditions in which reflected light is not perceived as overly bright at the time of starting projection, an unnecessary process is carried out whereby, when a projection instruction of a projection image is carried out, the pre-projection image is projected using a light quantity that is lower than when projecting the projection image.

It is therefore an object of the present invention to provide a projector and dimming method for controlling a light source according to the conditions of use of the projector to appropriately reduce the brightness of reflected light at the time of starting projection.

Means for Solving the Problem

The projector of the present invention includes: a light source that emits light; supply means that supplies driving electric power to the light source; projection means that modulates light that is emitted from the light source according to an image signal and projects the modulated light onto a projection surface; detection means that detects the intensity of ambient light of the projection surface; and control means that, upon receiving a lighting signal that indicates lighting of the light source, controls the supply means according to the intensity of light that was detected by the detection means to incrementally increase the driving electric power that is supplied from the supply means to the light source.

The dimming method of the present invention is a dimming method of a projector that has a light source that emits light, a supply means that supplies driving electric power to the light source, projection means that modulates light that is emitted from the light source according to an image signal and projects the modulated light onto a projection surface, and detection means that detects the intensity of ambient light of the projection surface, the dimming method including steps of: upon receiving a lighting that indicates that the light source is to be lit, controlling the supply means according to the intensity of light that was detected by the detection means to incrementally increase the driving electric power that is supplied from the supply means to the light source.

Effect of the Invention

According to the present invention, the light source is controlled according to the conditions of use of the projector to enable appropriate reduction of the brightness of reflected light at the time of starting projection.

MODE FOR CARRYING OUT THE INVENTION

An exemplary embodiment of the present invention is next described with reference to the accompanying drawings.

Figure 1:
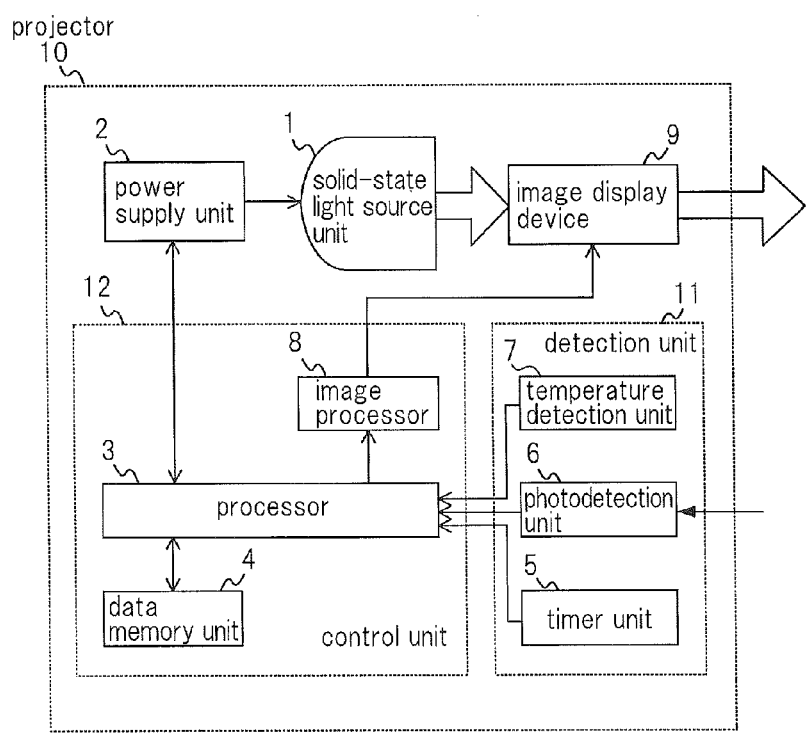
FIG. 1 is a block diagram showing the projector in an exemplary embodiment of the present invention.

FIG. 1 is a block diagram showing the projector in the present exemplary embodiment.

Projector 10 is equipped with: solid-state light source unit 1, power supply unit 2, image display device 9, detection unit 11, and control unit 12. Control unit 12 is equipped with processor 3, data memory unit 4, and image processor 8.

In the present exemplary embodiment, when the "Power-ON" button provided on projector 10 is pressed by the user, a lighting signal, that indicates that solid-state light source unit 1 is to be lit, and upon receiving this lighting signal, projector 10 lights solid-state light source unit 1.

In addition, when the "Power-OFF" button provided on projector 10 is pressed, a cut-off signal, that indicates that solid-state light source unit 1 is to be extinguished, and upon receiving this cut-off signal, projector 10 extinguishes solid-state light source unit 1.

Solid-state light source unit 1 is a light source made up of a semiconductor element. Solid-state light source unit 1 is realized by a light-emitting diode (LED) or by a laser diode (LD).

Solid-state light source unit 1 generates light and emits the light toward image display device 9. In addition, solid-state light source unit 1 generates heat by the emission of light. For example, solid-state light source unit 1 emits light of each of the colors of red, green, and blue.

Power supply unit 2 can also typically be referred to as the supply means.

Power supply unit 2 supplies driving electric power to solid-state light source unit 1 according to the control of control unit 12. Solid-state light source unit 1 emits light at the maximum luminance level when it receives driving electric power. The light quantity of light that is emitted from solid-state light source unit 1 increases with increases in the electric power that is supplied by power supply unit 2 to solid-state light source unit 1. In other words, the luminance of solid-state light source unit 1 increases with increases in the electric power that power supply unit 2 supplies to solid-state light source unit 1.

Image display device 9 can typically be referred to as the projection means.

Image display device 9 projects light that is emitted of solid-state light source unit 1 onto a screen that is a projection surface. Upon receiving an image signal, image display device 9 modulates light that is emitted from solid-state light source unit 1 according to the image signal and projects the light that was modulated as a projection image onto the screen.

For example, image display device 9 is made up from an optical modulation element and a projection lens. Upon receiving an image signal, the optical modulation element modulates the light of each color that is emitted from solid-state light source unit 1 according to the image signal, and the light that has been thus modulated is projected through the projection lens and onto a screen as a projection image. As an example, a liquid crystal panel or DMD (Digital Micromirror Device) panel is used as the optical modulation element.

Detection unit 11 can typically be referred to as the detection means.

Detection unit 11 detects the conditions under which projector 10 is being used and supplies a detection signal to control unit 12 that indicates the conditions under which projector 10 is being used. Detection unit 11 detects, for example, the intensity of ambient light of the screen, as the the conditions under which projector 10 is being used. In the present exemplary embodiment, detection unit 11 is equipped with timer unit 5, photodetection unit 6, and temperature detection unit 7.

Timer unit 5 can typically be referred to as measurement means.

Timer unit 5 measures the elapsed time from extinguishing solid-state light source unit 1 until a lighting signal is received. Timer unit 5 includes a time measurement capacitor and a timer that is incorporated in a CPU (Central Processing Unit).

The time measurement capacitor is a capacitance element that is charged when projector 10 is in a connected state with a commercial power supply and in which electric charge that has been charged in the capacitor decreases with the passage of time following removal of the power supply plug of projector 10 from the commercial power supply outlet.

As a result, in the state in which the power supply plug of projector 10 has been pulled from the commercial power supply outlet, timer unit 5 detects the amount of electrical charge of the time measurement capacitor and measures the elapsed time according to this amount of electrical charge.

In a state in which the power supply plug of projector 10 is inserted into an outlet, timer unit 5 uses the timer that is incorporated in the CPU to measure the elapsed time. Timer unit 5 supplies control unit 12 with time information that indicates the elapsed time following extinguishing of solid-state light source unit 1 as a detection signal.

Photodetection unit 6 is an optical sensor that detects the intensity of ambient light of the screen. Photodetection unit 6 detects ambient light of the screen on which a projection image is projected from projector 10, and supplies optical intensity information, that indicates the intensity of light that was detected, to control unit 12, as a detection signal. The difference between the reflected light of the projection image and the intensity of the ambient light of the screen increases with decreasing intensity that is indicated by the optical intensity information, and a person who views projector 10 will consequently tend to perceive the reflected light of the projection image as excessively bright. Photodetection unit 6 is realized by, for example, a photodiode.

Temperature detection unit 7 can typically be referred to as the temperature detection means.

Temperature detection unit 7 is a temperature sensor that detects the temperature in the vicinity of solid-state light source unit 1. In other words, temperature detection unit 7 detects the temperature inside the case of projector 10 (hereinbelow referred to as "internal temperature"). Temperature detection unit 7 may also detect the temperature of, for example, image display device 9 as the internal temperature. Temperature detection unit 7 is realized by, for example, a thermistor. Temperature detection unit 7 detects the internal temperature and supplies temperature information that indicates this internal temperature to control unit 12 as a detection signal.

Control unit 12 can typically be referred to as the control means.

Control unit 12, upon receiving a lighting signal, implements control of power supply unit 2 according to the detection signals supplied from detection unit 11 to incrementally increase the driving electric power that is supplied to solid-state light source unit 1 from power supply unit 2.

For example, upon receiving a lighting signal, control unit 12 receives optical intensity information that indicates the intensity of the ambient light of the screen from photodetection unit 6 and incrementally raises the driving electric power that is supplied to solid-state light source unit 1 if the intensity indicated by this optical intensity information is lower than a predetermined optical threshold value. On the other hand, if the intensity indicated by the optical intensity information surpasses a predetermined optical threshold value, control unit 12 implements control of power supply unit 2 in order to supply driving electric power to solid-state light source unit 1 from the time of starting projection.

Data memory unit 4 is realized by flash ROM (Flash Read Only Memory) or EEPROM (Electrically Erasable Programmable Read Only Memory).

Data memory unit 4 stores judgment threshold values for judging whether projector 10 is being used under conditions in which the projection image, from the time when an image is projection on screen, will be perceived as excessively bright. In the present exemplary embodiment, a condition under which projector 10 is used, in which a projection image at the time when an image is projection on a screen, is perceived as excessively bright, is referred to as a "cold start state," and condition under which projector 10 is used, in which the projection image, from the time when an image is projected onscreen, is not perceived as excessively bright, is referred to as "warm start state."

In the present exemplary embodiment, data memory unit 4 stores in advance as the judgment threshold values: a time threshold value from the time when solid-state light source unit 1 is extinguished until it is re-lit; a temperature threshold value of the internal temperature of projector 10, and an optical threshold value that indicates the intensity of ambient light of the screen. In addition, data memory unit 4 stores initial values indicating the driving electric power for causing solid-state light source unit 1 to emit light at the maximum luminance level.

Processor 3 is realized by, for example, a CPU. Processor 3, upon receiving a lighting signal, reads the initial values from data memory unit 4 and supplies these initial values to power supply unit 2.

In addition, upon receiving a lighting signal, processor 3 receives time information from timer unit 5 indicating the elapsed time from when solid-state light source unit 1 is extinguished and checks whether the elapsed time indicated by this time information surpasses the time threshold value in data memory unit 4.

When the elapsed time indicated by the time information is shorter than the time threshold value, processor 3 judges that projector 10 is in the wain start state and supplies a warm start instruction signal to power supply unit 2. Upon receiving the warm start instruction signal, power supply unit 2 supplies driving electric power that is indicated by the initial value to solid-state light source unit 1 from the start. In other words, when the elapsed time that was measured by timer unit 5 at the time of receiving the lighting signal is shorter than the predetermined time threshold value, processor 3 supplies the driving electric power to solid-state light source unit 1 from the start.

On the other hand, when the elapsed time indicated by the time information surpasses the time threshold value, processor 3 judges that projector 10 is in the cold start state and supplies a cold start instruction signal to power supply unit 2. Upon receiving the cold start instruction signal, power supply unit 2 incrementally raises the driving electric power that is supplied to solid-state light source unit 1. In other words, when the elapsed time that was measured by timer unit 5 at the time of receiving a lighting signal surpasses the predetermined time threshold value, processor 3 incrementally raises the driving electric power that is supplied to solid-state light source unit 1.

In addition, upon receiving a lighting signal, processor 3 receives temperature information from temperature detection unit 7 that indicates the internal temperature in the vicinity of solid-state light source unit 1 and checks whether the internal temperature indicated by this temperature information surpasses the temperature threshold value in data memory unit 4.

If the internal temperature indicated by the temperature information surpasses the temperature threshold value, processor 3 judges that projector 10 is in the warm start state and supplies a warm start instruction signal to power supply unit 2. Upon receiving the warm start instruction signal, power supply unit 2 supplies the driving electric power that is indicated by the initial value to solid-state light source unit 1 from the time of starting projection. In other words, when the internal temperature that is detected by temperature detection unit 7 at the time of receiving a lighting signal surpasses the predetermined temperature threshold value, processor 3 causes the driving electric power to be supplied from power supply unit 2 to solid-state light source unit 1.

On the other hand, if the internal temperature indicated by the temperature information is lower than the temperature threshold value, processor 3 judges that projector 10 is in the cold start state and supplies a cold start instruction signal to power supply unit 2. Upon receiving the cold start instruction signal, power supply unit 2 incrementally raises the driving electric power that is supplied to solid-state light source unit 1. In other words, when the internal temperature that is detected by temperature detection unit 7 at the time of receiving a lighting signal is lower than the predetermined temperature threshold value, processor 3 incrementally raises the driving electric power that is supplied to solid-state light source unit 1.

In addition, upon receiving a lighting signal, processor 3 receives optical intensity information from photodetection unit 6 indicating the intensity of ambient light of the projection surface and checks whether the intensity indicated by this optical intensity information is lower than the optical threshold value in data memory unit 4.

When the intensity indicated by the optical intensity information surpasses the optical threshold value, processor 3 judges that projector 10 is in the warm start state and supplies a warm start instruction signal to power supply unit 2. Upon receiving the warm start instruction signal, power supply unit 2 supplies the driving electric power that is indicated by the initial value to solid-state light source unit 1 from the start. In other words, when the intensity that is detected by photodetection unit 6 at the time of receiving a lighting signal surpasses the predetermined optical threshold value, processor 3 causes the driving electric power to be supplied from power supply unit 2 to solid-state light source unit 1.

On the other hand, when the intensity indicated by the optical intensity information is lower than the optical threshold value, processor 3 judges that projector 10 is in the cold start state and supplies a cold start instruction signal to power supply unit 2. Upon receiving the cold start instruction signal, power supply unit 2 incrementally raises the driving electric power that is supplied to solid-state light source unit 1. In other words, when the intensity that is detected by photodetection unit 6 at the time of receiving a lighting signal is lower than the predetermined optical threshold value, processor 3 incrementally raises the driving electric power that is supplied to solid-state light source unit 1.

Upon receiving an image signal from the outside, image processor 8 subjects this image signal to a correction process such as keystone distortion correction or color unevenness correction. Image processor 8 supplies the image signal that has undergone the correction process to image display device 9. Image processor 8 is realized by, for example, an image processing LSI (Large Scale Integration) circuit.

Figure 2:
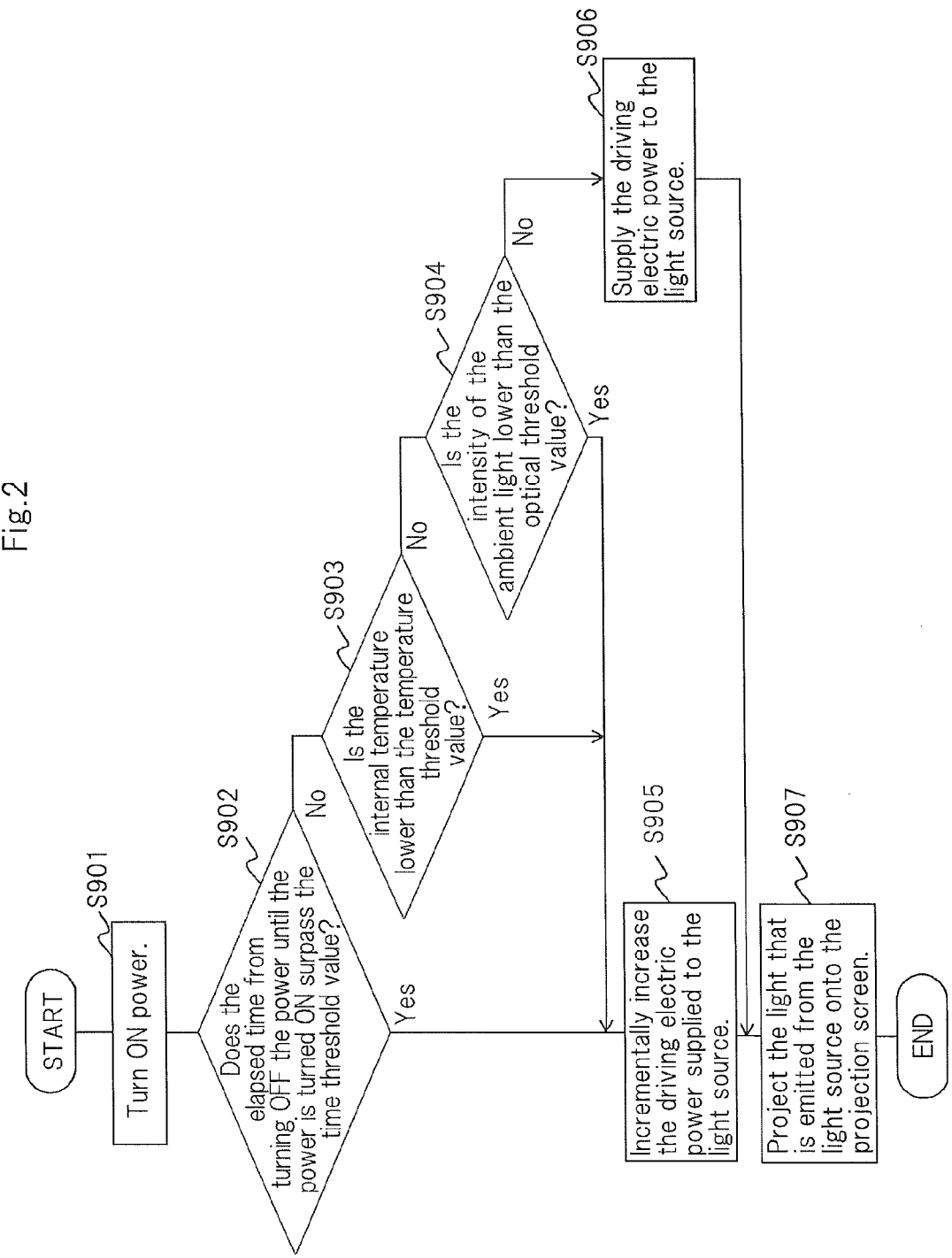
FIG. 2 is a flow chart showing the dimming method of the projector.

FIG. 2 is a flow chart showing the dimming method of projector 10.

It is here assumed that projector 10 newly receives a lighting signal in a state in which the power supply plug of projector 10 is inserted in an outlet and following extinguishing of solid-state light source unit 1 of projector 10. As a result, timer unit 5 uses the timer incorporated in a CPU to measure the elapsed time from the time when solid-state light source unit 1 is extinguished.

First, when the "Power-ON" button of projector 10 is pressed, processor 3 receives a lighting signal indicating lighting of solid-state light source unit 1 (Step S901).

Upon receiving the lighting signal, processor 3 receives time information that indicates the elapsed time that was measured by timer unit 5 and verifies whether the elapsed time indicated by the time information surpasses the time threshold value in data memory unit 4 (Step S902).

If the elapsed time indicated by the time information surpasses the time threshold value, processor 3 implements control over power supply unit 2 to incrementally raise the driving electric power that is supplied to solid-state light source unit 1 from power supply unit 2 (Step S903), whereby the luminance of solid-state light source unit 1 is raised in steps to the maximum luminance level.

On the other hand, if the elapsed time indicated by the time information is shorter than the time threshold value, processor 3 receives temperature information that indicates the internal temperature that was detected by temperature detection unit 7 and verifies whether the internal temperature that is indicated by this temperature information is lower than the temperature threshold value in data memory unit 4 (Step S904).

If the internal temperature that is indicated by the temperature information is lower than the temperature threshold value, processor 3 determines that projector 10 is in the cold start state and incrementally raises the driving electric power that is supplied to solid-state light source unit 1 (Step S903).

On the other hand, if the internal temperature that is indicated by the temperature information surpasses the temperature threshold value, processor 3 receives optical intensity information that indicates the intensity of the reflected light that is detected by photodetection unit 6 and verifies whether the intensity indicated by this optical intensity information surpasses the optical threshold value in data memory unit 4 (Step S905).

If the intensity indicated by the optical intensity information is lower than the optical threshold value, processor 3 judges that projector 10 is in the cold start state and incrementally raises the driving electric power that is supplied to solid-state light source unit 1 (Step S903).

On the other hand, if the intensity of light that is indicated by the optical intensity information surpasses the optical threshold value, processor 3 judges that projector 10 is in the warm start state and causes driving electric power to be supplied to solid-state light source unit 1 from the time of starting projection (Step S906), whereby light is emitted from solid-state light source unit 1 at the maximum luminance level from the time of starting projection.

When light is emitted from solid-state light source unit 1, image display device 9 modulates the light that is emitted from solid-state light source unit 1 in accordance with an image signal and projects the mod ate light as a projection image on a screen (Step S907). For example, if projector 10 is in the cold start state, image display device 9 projects an image on the screen while incrementally raising the luminance of the projection image up to the maximum luminance level. On the other hand, when projector 10 is in the warm start state, image display device 9 projects the projection image onto the screen at the maximum luminance level from the time of starting projection.

When the process of Step S907 has been completed, the series of processing procedures of the dimming method of projector 10 is completed. In FIG. 2, a state was assumed in which the power supply plug of projector 10 is inserted in an outlet during the interval from the time when solid-state light source unit 1 is extinguished to the time when it is re-lit, but when the power supply plug is pulled from the outlet, timer unit 5 uses the charge amount of the time measurement capacitor to measure the elapsed time.

According to the present exemplary embodiment, in projector 10 that includes: a laser diode or light-emitting diode that is solid-state light source unit 1 that emits light; power supply unit 2 that supplies driving electric power to solid-state light source unit 1; image display device 9 that modulates light that is emitted from solid-state light source unit 1 according to an image signal and projects this modulated light onto a screen; and detection unit 11 that detects the intensity of ambient light of the screen; control unit 12 that, upon receiving a lighting signal that indicates that solid-state light source unit 1 is to be lit, implements control of power supply unit 2 according to the intensity of light that is detected by detection unit 11 to incrementally raise the driving electric power that is supplied to solid-state light source unit 1 from the power supply unit.

For example, upon receiving a lighting signal, control unit 12 receives optical intensity information that indicates the intensity of light that is detected by detection unit 11 and, if the optical intensity information surpasses the predetermined optical threshold value, supplies the driving electric power to solid-state light source unit 1 from the time of starting projection. On the other hand, when the optical intensity information is lower than the predetermined optical threshold value, control unit 12 incrementally raises the driving electric power that is supplied to solid-state light source unit 1 from power supply unit 2.

As a result, when the surroundings of projector 10 are dark and the optical intensity information is lower than the optical threshold value, projector 10 determines a state in which the reflected light on the projection surface will be perceived as excessively bright at the time of starting projection and incrementally raises the luminance of solid-state light source unit 1. On the other hand, when the surroundings of projector 10 are bright and the optical intensity information surpasses the optical threshold value, projector 10 makes a determination about the state in which the reflected light will not be perceived as excessively bright, at the time of starting projection, and therefore causes light from solid-state light source unit 1 to be emitted at the maximum luminance level from the time of starting projection.

As a result, projector 10 is able to adjust the driving electric power that is supplied to the light source according to the conditions under which projector 10 is being used, to appropriately reduce the brightness of reflected light at the time of starting projection.

In the present exemplary embodiment, moreover, solid-state light source unit 1 is a device that generates heat by emitting light, and detection unit 11 includes temperature detection unit 7 that detects the internal temperature of the vicinity of solid-state light source unit 1 of projector 10. Control unit 12 then, upon receiving a lighting signal, incrementally raises the driving electric power that is supplied to solid-state light source unit 1 when the internal temperature that is detected by temperature detection unit 7 is lower than a predetermined temperature threshold value. On the other hand, upon receiving a lighting signal, control unit 12 causes power supply unit 2 to supply driving electric power to solid-state light source unit 1 when the internal temperature that is detected by temperature detection unit 7 surpasses a predetermined temperature threshold value, and moreover, the optical intensity information surpasses a predetermined optical threshold value.

When a fixed time interval has passed from the previous use of projector 10, the eyes of a viewer will not adapt to the reflected light of the projection image that is projected on the screen, and the projected light is highly likely to be perceived as excessively bright at the time of starting projection even under conditions in which the screen environment is bright.

As a result, when the internal temperature of projector 10 is lower than the predetermined temperature threshold value, it is judged that a fixed time interval has elapsed from the time projector 10 was previously used and the luminance of solid-state light source unit 1 is incrementally raised even under conditions in which the surroundings of projector 10 are bright.

Projector 10 is therefore able to more reliably detect a state in which the projected light is highly likely to be perceived as excessively bright at the time of starting projection and is able to more reliably reduce the brightness of reflected light at the time of starting projection.

In the present exemplary embodiment, moreover, detection unit 11 includes timer unit 5 that measures the elapsed from the time when solid-state light source unit 1 is extinguished until a lighting signal is received, and control unit 12, upon receiving a lighting signal, incrementally raises the driving electric power that is supplied to solid-state light source unit 1 when the elapsed time that is measured by timer unit 5 surpasses a predetermined time threshold value. On the other hand, upon receiving a lighting signal, control unit 12 causes power supply unit 2 to supply driving electric power to solid-state light source unit 1 when the elapsed time measured by timer unit 5 is shorter than the predetermined time threshold value, and moreover, when the optical intensity information surpasses the predetermined optical threshold value.

As a result, projector 10 makes a determination about the state in which the reflected light will be perceived as excessively bright, at the time of starting projection and therefore incrementally raises the luminance of solid-state light source unit 1 even when the surroundings of projector 10 are bright if a fixed time interval has elapsed from the time that projector 10 was previously used.

Projector 10 is therefore able to more reliably detect a state in which reflected light is highly likely to be perceived as excessively bright at the time of starting projection and is able to more reliably reduce the brightness of reflected light at the time of starting projection.

The configuration shown in the figure in the exemplary embodiment described hereinabove is merely an example, and the present invention is not limited to this configuration.

EXPLANATION OF REFERENCE NUMBERS

1 solid-state light source unit
2 power supply unit
3 processor
4 data memory unit
5 timer unit
6 photodetection unit
7 temperature detection unit
8 image processor
9 image display device
10 projector
11 detection unit
12 control unit

What is claimed is:

1. A projector comprising:
   a light source that emits light;
   a supply unit that supplies driving electric power to said light source;
   a projection unit that modulates light that is emitted from said light source according to an image signal and projects said modulated light onto a projection surface;
   a detection unit that detects an intensity of ambient light; and
   a control unit that, upon receiving a lighting signal that indicates that said light source is to be lit, controls said supply unit according to the intensity of light that is detected by said detection unit to incrementally increase the driving electric power that is supplied from said supply unit to said light source;
   wherein said detection unit includes a temperature detection unit that detects an internal temperature in a vicinity of said light source; and
   said control unit, upon receiving said lighting signal, causes said supply unit to supply said driving electric power to said light source when the internal temperature that was detected by said temperature detection unit surpasses a predetermined temperature threshold value, and incrementally increases an amount of the driving electric power that is supplied to said light source when the internal temperature that is detected by said temperature detection unit is lower than said predetermined temperature threshold value.

2. The projector as set forth in claim 1, wherein said control unit, upon receiving said lighting signal, causes said supply unit to supply said driving electric power to said light source when the intensity of the light that is detected by said detection unit surpasses a predetermined optical threshold value, and incrementally increases the amount of the driving electric power that is supplied to said light source when the intensity of the light detected by said detection unit is lower than said predetermined optical threshold value.

3. The projector as set forth in claim 1, wherein said light source comprises a light-emitting diode.

4. The projector as set forth in claim 1, wherein said light source comprises a laser diode.

5. A projector comprising:
   a light source that emits light;
   a supply unit that supplies driving electric power to said light source;
   a projection unit that modulates light that is emitted from said light source according to an image signal and projects said modulated light onto a projection surface;
   a detection unit that detects an intensity of ambient light; and
   a control unit that, upon receiving a lighting signal that indicates that said light source is to be lit, controls said supply unit according to the intensity of light that is detected by said detection unit to incrementally increase an amount of the driving electric power that is supplied from said supply unit to said light source;
   wherein said detection unit includes a measurement unit that measures an elapsed time when said light source is extinguished until said lighting signal is received; and
   wherein, said control unit, upon receiving said lighting signal, causes said supply unit to supply said driving electric power to said light source when the elapsed time that is measured by said measurement unit is shorter than a predetermined time threshold value, and incrementally increases the amount of the driving electric power that is supplied to said light source when the elapsed time that is measured by said measurement unit surpasses said predetermined time threshold value.

6. The projector as set forth in claim 5, wherein said control unit, upon receiving said lighting signal, causes said supply unit to supply said driving electric power to said light source when the intensity of the light that is detected by said detection unit surpasses a predetermined optical threshold value, and incrementally increases the amount of the driving electric power that is supplied to said light source when the intensity of the light detected by said detection unit is lower than said predetermined optical threshold value.

7. The projector as set forth in claim 5, wherein said light source comprises a light-emitting diode.

8. The projector as set forth in claim 5, wherein said light source comprises a laser diode.

9. A dimming method of a projector that includes a light source that emits light, a supply unit that supplies driving electric power to said light source, a projection unit that modulates light that is emitted from said light source according to an image signal and projects said modulated light onto a projection surface, and a detection unit that detects an intensity of ambient light, said dimming method comprising:

upon receiving a lighting signal indicating that said light source is to be lit, controlling said supply unit according to the intensity of the light that is detected by said detection unit to incrementally increase an amount of the driving electric power that is supplied from said supply unit to said light source;

wherein said detection unit includes a temperature detection unit that detects an internal temperature in a vicinity of said light source; and wherein said control unit, upon receiving said lighting signal, causes said supply unit to supply said driving electric power to said light source when the internal temperature that is detected by said temperature detection unit surpasses a predetermined temperature threshold value, and incrementally increases the amount of the driving electric power that is supplied to said light source when the internal temperature that is detected by said temperature detection unit is lower than said predetermined temperature threshold value.

10. The dimming method as set forth in claim 9, wherein, regarding the incremental increase of driving electric power that is supplied to said light source:

said driving electric power is supplied to said light source from said supply unit upon receiving said lighting signal when the intensity of the light that is detected by said detection unit surpasses a predetermined optical threshold value, and when the driving electric power that is supplied to said light source is incrementally increased when the intensity of the light that is detected by said detection unit is lower than said predetermined optical threshold value.

11. A dimming method of a projector that includes a light source that emits light, a supply unit that supplies driving electric power to said light source, a projection unit that modulates light that is emitted from said light source according to an image signal and projects said modulated light onto a projection surface, and a detection unit that detects an intensity of ambient light and includes a measurement unit, said dimming method comprising:

upon receiving a lighting signal indicating that said light source is to be lit, controlling said supply unit according to the intensity of the light that is detected by said detection unit to incrementally increase an amount of the driving electric power that is supplied from said supply unit to said light source;

wherein, said control unit, upon receiving said lighting signal, causes said supply unit to supply said driving electric power to said light source when an elapsed time that is measured by said measurement unit is shorter than a predetermined time threshold value, and incrementally increases the amount of the driving electric power that is supplied to said light source when the elapsed time that is measured by said measurement unit surpasses said predetermined time threshold value.

12. The dimming method as set forth in claim 11, wherein, regarding the incremental increase of driving electric power that is supplied to said light source:

said driving electric power is supplied to said light source from said supply unit upon receiving said lighting signal when the intensity of the light that is detected by said detection unit surpasses a predetermined optical threshold value, and when the driving electric power that is supplied to said light source is incrementally increased when the intensity of the light that is detected by said detection unit is lower than said predetermined optical threshold value.

* * * * *